US010908027B2

(12) United States Patent
Diether et al.

(10) Patent No.: US 10,908,027 B2
(45) Date of Patent: Feb. 2, 2021

(54) COMPENSATING A SENSOR SIGNAL

(71) Applicant: Sensirion AG, Stafa (CH)

(72) Inventors: Salomon Diether, Wetzikon (CH); Kristian Baumann, Gauting (DE)

(73) Assignee: Sensirion AG, Stafa (CH)

( * ) Notice: Subject to any disclaimer, the term of this patent is extended or adjusted under 35 U.S.C. 154(b) by 635 days.

(21) Appl. No.: 15/803,315

(22) Filed: Nov. 3, 2017

(65) Prior Publication Data
US 2018/0143084 A1 May 24, 2018

(30) Foreign Application Priority Data

Nov. 21, 2016 (EP) ..................... 16199823

(51) Int. Cl.
*G01K 1/20* (2006.01)
*G01D 3/036* (2006.01)
*G01K 7/42* (2006.01)
*G01D 3/02* (2006.01)

(52) U.S. Cl.
CPC ............... *G01K 1/20* (2013.01); *G01D 3/022* (2013.01); *G01D 3/036* (2013.01); *G01K 7/42* (2013.01)

(58) Field of Classification Search
CPC ............. G01K 1/20; G01K 7/42; G01D 3/036
USPC .................................. 374/128, 133, 169, 172
See application file for complete search history.

(56) References Cited

U.S. PATENT DOCUMENTS

| 9,366,584 B2 | 6/2016 | Graf et al. |
| 2011/0307208 A1* | 12/2011 | Graf ..................... G01D 3/0365 |
| | | 702/104 |
| 2015/0292959 A1* | 10/2015 | Graf ..................... G01K 15/005 |
| | | 374/1 |

FOREIGN PATENT DOCUMENTS

EP   2850394   10/2015

* cited by examiner

*Primary Examiner* — Benjamin R Schmitt
(74) *Attorney, Agent, or Firm* — Cooper & Dunham LLP (57) ABSTRACT

A method for processing a signal supplied by a sensor comprises receiving the sensed signal, and compensating the sensed signal for a contribution caused by one or more components thermally coupled to the sensor. The compensated signal in its dynamics, and the dynamics adjusted compensated sensor signal is provided.

15 Claims, 4 Drawing Sheets

COMPENSATING A SENSOR SIGNAL

CROSS REFERENCE TO RELATED APPLICATIONS

This application claims the priority of European Patent Application No. 16199823.2, filed Nov. 21, 2016, the disclosure of which is incorporated herein by reference in its entirety.

TECHNICAL FIELD

The present invention relates to a method for processing a signal supplied by a sensor, to a sensor signal processing system, and to a related computer program product.

BACKGROUND ART

Various components, e.g. electronic components, within electronic devices produce heat during runtime. Although modern electronic devices are increasingly designed to minimize self-heating in order to increase energy efficiency, temperature offsets due to internal heat dissipation remain a common issue that make it challenging to sense e.g. ambient temperature. Prior art estimates ambient temperature or the temperature at a given location by using temperature measurements taken from one or multiple temperature sensors within a device, additional inputs that indicate power consumption and thus heat dissipation of various heat emitting internal components and combining these inputs with appropriate algorithmic methods that compensate the internal heat effects that usually vary over time, see EP 2 850 394 B1.

A great challenge especially in relation to many stationary and quasi-stationary devices is to accurately capture and compensate the heat-up behavior. Right after power-on an electronic device has an unknown internal state, i.e. it may either be in a fully cooled-down state or it may be in a state still containing internal heat that has not dissipated completely yet. Prior art either assumes the same initial internal state after each power-on event, or it employs an additional input that indicates the actual internal state of the device right after power-on, see U.S. Pat. No. 9,366,584 B2.

The first approach usually works well in case of a device "cold start", i.e. the electronic device has fully cooled down since the previous power-off. In other words, no heat contribution remains from previous operations of the electronic device. Accordingly, the cold start hereby describes the power-on behavior of a device after having been fully cooled-down. A device fully cools down to ambient temperature after having been powered-off for a long enough period such that all internal heat has dissipated completely. Ambient temperature is the temperature ambient of the electronic device, and is also referred to as environmental temperature. In a fully cooled-down device, all internal components and especially all temperature sensors are at ambient temperature. Such device condition serves as well-defined initial state for temperature sensing.

However, the first approach is not able to compensate a "warm start" correctly and produces inaccurate temperature estimates for many minutes to hours. A warm start occurs, when the electronic device is powered on shortly after having been powered off, i.e. the device is switched on within seconds or minutes after a previous power-off. Common reasons for a device warm start are user interactions that cause a device to power off and start up again, device resets triggered by the device or a cloud-based software update service, electrical power cuts and others. In case of a warm start, the internal state of the device right after switch-on is unknown and thus temperature compensation methods that pre-assume a certain initial internal state necessarily return inaccurate temperature estimates for many minutes to hours, until the expected and the actual temperature offset of the device converge. The time span how long ambient temperature estimates of the first approach are inaccurate depends on the dynamic behavior of the respective electronic device and the required accuracy.

The second approach solves the drawback of the first approach by employing an additional input from the device right after power-on that indicates the internal device state. This additional input is usually the time span how long a device has been powered-off before, named "off-time-period" in the following. From this information the internal state of the device right after switch-on can be estimated, e.g. by using a thermodynamic model of the device, and taken into account for temperature compensation. This approach returns accurate temperature estimates as soon as the additional input is available and the internal device state has been estimated. However, information such as the off-time-period may not be available in many electronic devices, as this requires additional measures such as a real-time clock that continues running even when the electronic device is powered-off or the use of absolute time-stamps that are retrieved from a remote internet-based time-service. The latter approach needs to periodically store the retrieved absolute timestamp either on local non-volatile memory, which is often not available or only available as flash memory which limits the amount of read-write operations over its lifetime, or on a remote internet storage, which requires considerable efforts and also comes with risks such as network outages or varying latencies.

DISCLOSURE OF THE INVENTION

The problem is solved by a method for processing a signal supplied by a sensor, and by a system comprising such sensor.

While in the following it is mainly referred to the sensor being a temperature sensor, this shall not be construed as a limitation, and as will introduced later on, the sensor may be sensing a parameter different from temperature.

In a first variant, heat emitting components are arranged in an electronic device that at the same time comprises the temperature sensor. Electronic devices are understood as devices powered by electrical energy and performing a function that is electronically supported. For example, an electronic device may comprise a housing including various components necessary for performing the desired functions. Such components are typically packed very dense in the housing in order to limit the volume/extension of the device. Hence, in case the sensor is a temperature sensor, other components that emit heat when being activated, i.e. in particular when being electrically powered and operated, may impact the sensing of the temperature by the temperature sensor. Components that consume electrical power and thereby release heat during operation may include one or more of a processor, a display, an energy storage, a communication transceiver, or others.

In a second variant, the heat emitting components are not comprised in the electronic device of the temperature sensor but are located outside the device. However, such one or more heat emitting components may still be thermally coupled to the temperature sensor, and accordingly to the electronic device. Such components may release heat either by producing heat and thus influencing the temperature sensor, such as heater systems, or by transferring heat to the temperature sensor, such as air conditioners. In one example, the electronic device preferably is a thermostat that may in one embodiment even be attached to the heating system, such as a radiator.

Thermal coupling between the component/s and the temperature sensor can be achieved by thermal conduction or thermal convection or thermal radiation.

As a result, in both variants, the temperature sensor not only senses the target temperature, which is the real temperature e.g. of the ambient, or of a component inside the device, or of a location inside the device, or of a room heated by a radiator, but a temperature instead including a heat contribution stemming from the one or more heat emitting components. Or, in other words, the target temperature is perturbed by the self-heating of the one or more heat emitting components also referred to as heat sources.

The temperature to be measured by the temperature sensor may in one embodiment be the temperature ambient to the electronic device containing the temperature sensor. Here, the temperature sensor preferably provides a sufficient thermal coupling to the environment of the electronic device, e.g. by exposing the temperature sensor to the ambient directly or through openings in a housing of the device or by other means. In such embodiment, the heat emitting component may either be located inside the electronic device, or be located outside the electronic device, or, in case of multiple heat emitting components, both. In another embodiment, the temperature sensor may be arranged for sensing a device internal temperature at a given location. For example, the temperature of interest may be the temperature of a component such as the central processing unit of the device, or the battery. Here, the temperature sensor is arranged at the location of the subject component, and/or is otherwise thermally coupled thereto. Again, the heat emitting component may reside inside or outside the housing of the electronic device.

Accordingly, a compensator is used for determining a heat compensated temperature which better reflects the target temperature, which in one embodiment may be the ambient temperature, or in another embodiment may be a device internal temperature. This compensated temperature represents an estimate of the target temperature based on the sensed temperature as supplied by the temperature sensor and by taking into account the heat generated by the at least one heat source. The impact of the one or more heat emitting components may be determined by additional temperature sensors arranged outside of or within the device, and/or by information related to the electrical power consumed by such components and/or by a reference measurement that measures the heat impact and is used for compensation purposes. As a result, the sensed temperature is corrected by a temperature value representing the amount of heat presently acting on the temperature sensor and stemming from the present operation of the subject heat source/s. This value is also referred to as heat contribution or heat-up temperature value.

In a typical steady state operation of the heat emitting component/s, such heat contribution may be rather constant over time. However, in particular after powering-on the one or more heat emitting components, the heat contribution varies over time, and in particular rises over time from zero to a steady state heat contribution. Such a heat contribution in response to a power-on of the component/s may be recorded with the temperature sensor over time, and be stored for compensation purposes, either in the device or elsewhere. In operation of the components/s, and specifically in response to a power-on of the component/s, the stored heat contribution over time may be subtracted from the temperature values sensed by the temperature sensor. The result is referred to as heat compensated temperature signal. Hence, the heat contributions are removed by way of compensation such that the output provides a course of temperature at the location of the temperature sensor unaffected by additive heat contributions from the components. In the first variant with the electronic device comprising the heat emitting component/s e.g. inside a housing that at the same time houses the temperature sensor, the power-on of the one or more heat emitting component/s may be represented by the power-on of the device. In the second variant with the heat emitting components being arranged outside the housing of the electronic device containing the temperature sensor, the power-on may include either a switching on of the component such as a radiator, or may be represented by an increase of the power of such heating system, an indicator of which power increase may be supplied to the electronic device.

The resulting heat compensated temperature signal reflects the target temperature in the event of a cold start of the component/s. A cold start is assumed as scenario in which, at the time of a power-on of the component/s, the temperature sensor does not sense a heat contribution from any of the component/s, and more specifically no heat contribution that has its origin in a previous power-on state of the component/s, i.e. a power-on state prior to the most previous powering-off of the component/s. Hence, at the time of a cold start any heat residuals inside the device containing the temperature sensor from a previous power-on state have dissipated, and preferably all heat emitting components have cooled down to ambient temperature. In case of the heat emitting component/s residing inside the electronic device, the power-on of the component/s at the same time can be represented by a power-on of the electronic device, and hence may include the beginning of a new temperature measurement.

A warm start instead is considered as the powering-on of the component/s at a point in time at which residual heat from a previous operation of the component/s are still found inside the device, and specifically are sensed at the location of the temperature sensor and hence contribute to the sensed temperature signal.

Hence, at the time of a warm start heat residuals from a previous power-on state of the component/s have not yet fully dissipated from the device containing the temperature sensor, and preferably all heat emitting components have not yet cooled down to ambient temperature. Again, in case of the heat emitting component/s residing inside the electronic device, the power-on of the component/s at the same time can be represented by a power-on of the electronic device, and hence may include the beginning of a new temperature measurement.

In the event of a warm start, and preferably under the assumption of a constant or quasi-constant target temperature, the latter of which is defined by the target temperature changing slower than the residual heat dissipating from the device, the heat compensated temperature signal shows excess temperature values for some period given that the sensed temperature signal is compensated for the cold start event. In case of a warm start, the residual heat in the device is not known without determining the interval between the previous power-off and the present power-on. The residual heat from the previous power-on state renders excess values in the heat compensated temperature signal.

Therefore, it is suggested to further process the heat compensated temperature signal, and in particular to adjust the dynamics of the heat compensated temperature signal. Dynamic components in a signal, and specifically in the heat compensated temperature signal are considered as changes in the signal over time, and may be described by non-zero gradients of the signal in the time domain, or by non-zero frequencies of the signal in the frequency domain.

In response to such processing, a dynamics adjusted heat compensated temperature signal is supplied to a user, e.g. via a display of the device, or via a display of a different device, or to an application, e.g. for controlling a component such as the heater or the climate control, or for controlling a different device, which signal provides the target temperature value e.g. of the ambient, or of a component or a location inside the electronic device.

The adjusting of the dynamics of the heat compensated temperature signal relies on the insight that in case of a cold start, the heat compensated temperature signal is constant or quasi-constant representing the target temperature: The sensed temperature signal is compensated by the known heat contributions of the components in the event of a cold start. Accordingly, the heat compensated temperature signal does not show any dynamics, i.e. variations or changes in its course over time, but remains constant under the assumption that the target temperature remains constant. As a result, any dynamic components in the output of the compensator that occur during a warm start period may be modified without impacting the heat compensated signal in the event of a cold start. And indeed the output of the compensator in case of a warm start shows dynamic components, i.e. variations in the signal over time, or frequency contributions other than f=0. In particular, these dynamics are represented by a decrease of the heat compensated temperature signal over time that is owed to a dissipation of the residual heat which process is also referred to as cool-down characteristic of the device. Accordingly, adjusting one or more of the frequency components in the heat compensated temperature signal affects the heat compensated temperature signal only in the event of a warm start, but not in the event of a cold start. In case the dynamics of the heat compensated temperature signal are accelerated, the interval in which the heat compensated temperature signal decreases can be reduced such that the heat compensated temperature signal adjusted in such way limits the time of deviation from the target temperature to a minimum during the warm start period while for the remaining time shows the target temperature even in the event of a warm start.

Accordingly, it is specifically suggested to accelerate the dynamics of a cold start heat compensated temperature signal, at least for a certain time after component or device switch-on/power-on. The acceleration of the dynamics of the heat compensated temperature signal thereby preferably captures the device's characteristic cool-down behavior, which may or may not be similar or equivalent to any other dynamic behavior of the device with respect to temperature (e.g. heat-up dynamics, dynamic response of device toward ambient temperature changes, etc.).

For a reproducible result, the cool-down behavior of the device preferably is reproducible, is captured and is modelled. During applying the dynamic compensation on the heat compensated temperature signal, it is preferred that the target temperature remains constant, or quasi-constant e.g. within a tolerance of 10%, for some time after the component or device is powered-on. Accordingly, the signal dynamics of the target temperature is much slower than the signal dynamics of the device's cool-down behavior. The present idea is further based on the insight that a physical cool-down process in the device can be understood to always continue until it comes to a standstill, even after the component/s is/are switched-on again. In that case the cool-down process continues "underneath" the heat-up process and the resulting impact in the sensed temperature signal can be considered as accumulation of heat-up and cool-down behaviors. This allows to accelerate any potentially remaining cool-down process that contributes to a temperature signal after it is heat compensated with the cold start heat-up characteristics. In case of a real cold start and constant or quasi-constant target temperature, no dynamic residuals contribute to the cold start heat compensated temperature signal, thus a dynamic acceleration applied on a constant signal will have no effect. On the other hand, in case a dynamic residual is still found within the temperature signal after cold start compensation, this residual origins from the still ongoing cool-down process in the device, which means that the component was powered-on in a warm start. The cold start heat compensated temperature signal will—without the suggested adjustment in the frequency spectrum—eventually converge to the correct target temperature value, only that it takes long. Thus, by accelerating a cold start heat compensated temperature signal with the device's cool-down dynamics, the output signal, i.e. a dynamics adjusted heat compensated temperature signal, will approach the target temperature much faster.

After the target temperature is reached and preferably is estimated as constant or quasi-constant, the device's internal state can now be estimated exactly and in the following the dynamic acceleration of the cold start heat compensated temperature signal may either be switched off, or be adapted to a system's characteristic behavior during ambient temperature changes, or just kept going. The latter option may be preferred only in case of simple thermal systems with identical dynamic behavior during device cool-down, heat-up and ambient temperature changes.

The main benefit of the present idea over the prior art is that it does not require any additional sensor or any additional input from the device during runtime compared to prior compensation algorithms. Instead, for most devices no additional characterization measurement is required, as heat-up and cool-down behavior are mostly similar or even equivalent.

The proposed method is especially relevant for stationary or quasi-stationary devices—the latter remaining for a period of at least 90% of their lifetime of the device stationary at one or more locations—, e.g. temperature sensing devices in rooms or outdoors remaining stationary at a location where the target temperature is assumed to stay constant or change slowly during the first few minutes after device switch-on. In that case, the proposed method follows the target temperature already shortly after device switch-on, despite any potential heat stored within the device from previous use, i.e. in the event of a warm start. Accurate estimates of the target temperature may in some cases be available almost instantaneously after component switch-on, i.e. in the order of few data samples. In other embodiments, where signal noise and model inaccuracies are present, estimates of the target temperature quickly drop to the target temperature, i.e. within the order of seconds to few minutes.

According to another aspect of the present invention, a sensor signal processing system comprises a temperature sensor, preferably comprised in an electronic device, providing a sensed temperature signal. One or more heat emitting components are provided inside or outside the electronic device, and are thermally coupled to the temperature sensor. A compensator, arranged in the electronic device or remote, is configured to compensate the sensed temperature signal for a heat contribution caused by the one or more heat emitting components. In addition, a compensation filter, arranged in the electronic device or remote, is configured to adjust the heat compensated signal in its dynamics. In case the sensor, the compensator, and the compensation filter are all comprised in the electronic device, the sensor signal processing system is represented by the electronic device.

In case the compensator and the compensating filter are arranged remote from the temperature sensor, i.e. not within a common electronic device, the procedure of compensating may be achieved in the cloud, i.e. at a processing location in the Internet, and the sensed temperature signal may be transmitted thereto wireless or wire-bound, while the dynamics adjusted heat compensated signal is returned from the cloud to the electronic device, or even to a third device, e.g. a smart phone of a user.

The compensation filter is established for compensating for impacts on the dynamics of the heat compensated temperature signal, i.e. impacts on its course over time, and manifestly its frequency spectrum. Presently, the device may be modelled as a heat dissipating system. Such model models the behaviour of the device, preferably at the location of the sensor, in the event of a cool-down of heat contributions in the device in response to a power-off of the component/s. Hence, heat dissipation from the device in response to the power-off of the components—which may coincide with the power-off of the device in case the components reside inside the device—is modelled, and one or more of the sensors, components of the device, and in particular a housing of the device, may be relevant to the heat dissipating behaviour to the ambient. Such dissipation characteristics over time can be modelled. Specifically, the heat dissipation behaviour modelled is a decreasing heat characteristic over time. Accordingly, the output of the heat compensator is dynamically compensated. This means, that the dynamic components of the heat compensated temperature signal are adjusted such that the response time is decreased. Such effort in decreasing the response time of a system is also understood as compensation of the output signal and especially dynamic compensation.

By using a dynamic compensation filter, the response of a system, i.e. its output in response to a change in the input, will be accelerated. If the dynamics of the heat dissipating system represented by the electronic device including its housing are known, an observer, i.e. the compensation filter, can be implemented to estimate the true physical value of the system input, i.e. the heat compensated temperature. This observer compensates for the system dynamics such that the response can be considerably accelerated in time, which means that the response time can be considerably decreased. The response time in this instance is the time it takes for the heat compensated temperature signal to drop down to the target temperature. Preferably, the compensation filter is modelled in form of a transfer function that is based on an inverse of the transfer function of the heat dissipating system.

Preferably, the dynamics adjusted heat compensated temperature signal is displayed on a display of the electronic device or is supplied to a different electronic device, such as a smart phone, and is displayed there.

Preferably, the heat compensation and the dynamics adjusting are applied starting with powering-on the any relevant heat emitting components, and preferably in response to powering-on the device containing the heat emitting component/s if so. In a preferred embodiment, the dynamics adjustment is terminated after a defined period in time, in particular which period in time is defined by the time a steady state level of the heat contribution is expected to be reached in the event of a power-off.

As already indicated above, the application in temperature sensing is only one of many possible applications subsumed hereunder. In one embodiment, the sensor is a gas sensor for sensing the presence and/or concentration of a gas, again assuming constant or quasi-constant target gas concentration. In this case, the counterpart to the heat emitting components impacting temperature measurement even after a power-off of the device may be device components, e.g. plastic components such as parts of a housing or a circuit board, that are capable to temporarily accept gas and/or release gas even if the gas impact from the ambient no longer is present. Such components may absorb gas after a power-off of the device which temporarily reduces the amount of gas sensed by the gas sensor in the event of a warm start of the device. Accordingly, a gas sensing signal compensated for outgassing in a cold start event may still show dynamics in the event of a warm start stemming from a previous operation of the device. Specifically, the gas releasing or absorbing components may be different from the heat emitting components; however, the exposure of such components to heat may encourage the gas releasing or absorbing effect in these components. In a different embodiment, the heat emitting components at the same time act as gas releasing or absorbing components.

In a different embodiment, the sensor is a humidity sensor for sensing the presence and/or concentration of humidity in the air supplied to the humidity sensor. In this case, the counterpart to the heat emitting components may be device components, e.g. plastic components such as parts of a housing or a circuit board, that are capable to temporarily accept humidity and release humidity even if humid air supply from the ambient no longer is present. Such components may still absorb humidity a certain time after a power-off of the device which temporarily reduces the amount of humidity sensed by the humidity sensor in the event of a warm start of the device. Accordingly, a humidity sensing signal compensated for releasing humidity in a cold start event may still show dynamics in the event of a warm start stemming from a previous operation of the device.

Specifically, the humidity releasing or absorbing components may be different from the heat emitting components; however, the exposure of such components to heat may encourage the humidity releasing or absorbing effect in these components. In a different embodiment, the heat emitting components at the same time act as humidity releasing or absorbing components.

And analogue to temperature sensing, it is preferred to model the compensation filter for compensating for any warm start based on an inverse of a transfer function of a system model for the dissipation and absorption of gas or humidity in the device, respectively.

Preferably, the sensor signal processing system has its main purpose in monitoring ambient conditions of its environment and either displaying the measured and compensated values or using them to control one or multiple environmental conditions. Exemplary electronic devices comprised in the system are consumer electronics, such as Smart Home devices, Internet-of-Things devices, or mobile phones. Other examples of electronic devices comprised in the system are devices for heating, ventilation, air conditioning (HVAC), air quality meters, or air purifiers, thermostats and smart thermostats, automotive applications, and medical applications.

Other advantageous embodiments are listed in the dependent claims as well as in the description below. The described embodiments similarly pertain to the device, the method, and a computer program element claimed. The embodiments described for temperature sensing similarly pertain to gas or humidity sensing. Synergetic effects may arise from different combinations of the embodiments although they might not be described in detail.

BRIEF DESCRIPTION OF THE DRAWINGS

The detailed description refers to embodiments of the present invention. Such description makes reference to the annexed drawings, wherein.

DETAILED DESCRIPTION

Figure 1:
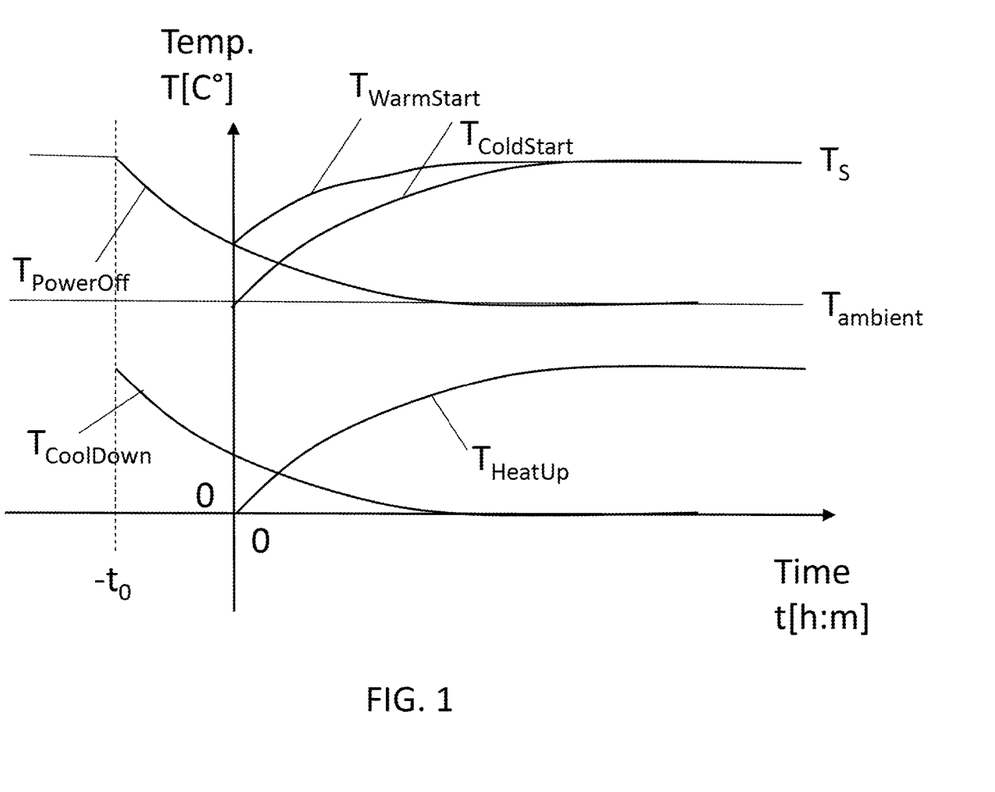
FIGS. 1, 3, 4 and 5 illustrate sample temperature characteristics thereby illustrating methods according to embodiments of the present invention.

FIG. 1 shows temperature graphs T in connection with a cold start and a warm start of an electronic device containing heat emitting components inside the device affecting temperature measurement, thereby referring to a method according to an embodiment of the present invention.

The temperature graphs T are depicted in a temperature T over time t diagram. Temperature T shall be in degrees Celsius, time t in format [hours:minutes].

It is presently assumed that the parameter to be measured by means of a temperature sensor in an electronic device is the ambient temperature $T_{ambient}$, i.e. the temperature ambient to the electronic device, also referred to as target temperature, or as reference temperature $T_{ref}$. It is presently assumed that the ambient temperature $T_{ambient}$ is constant in the investigated period in time.

The graph $T_{HeatUp}(t)$ represents a temperature signal that describes a temperature offset in an electronic device due to self-heating after a power-on of the device at time t=0. Accordingly, $T_{HeatUp}(t)$ refers to heat contributions from the device only but not from the ambient.

In the present chart, a course of temperature $T_{ColdStart}(t)$ is depicted, in the event the device is powered on at time t=0. The cold start presently is defined that a preceding power-off of the electronic device is assumed to have taken place a sufficient time prior to t=0 such that no heat contributions from previous operations of the device are left. In other words, the device including its components is at ambient temperature $T_{ambient}$ at time t=0. Accordingly, the course of temperature in the event of a cold start is:

$$T_{ColdStart}(t)=T_{ambient}(t)+T_{HeatUp}(t) \quad \text{(Eq. 1)}$$

In the event of a cold start, $T_{ColdStart}(t)$ would be the course of temperature measured by a temperature sensor of/in the device.

The graph $T_{CoolDown}(t)$ instead denotes a temperature signal over time that describes the temperature offset of the device after having been powered-off, here at time t=0, i.e. describes the cool-down behavior of the device. $T_{CoolDown}(t)$ refers to heat contributions from the device only but not from the ambient.

Accordingly, the course of temperature $T_{PowerOff}(t)$ when the device is powered-off is:

$$T_{PowerOff}(t)=T_{ambient}(t)+T_{CoolDown}(t) \quad \text{(Eq. 2)}$$

In the event of a warm start, heat contributions remain from a previous power-on period of the device. In FIG. 1 it is presently assumed that the device was powered-off at time $t=-t_0$ preceding the power-on at t=0. The interval $[(t=0)-t_0]$ accordingly is insufficient to have the previously induced heat dissipated from the interior of the device.

It can be assumed that the characteristic cool-down behavior in the event of a power-off continues after a device is switched-on again. Hence, in the event of a warm start the cool-down behavior remains "underneath" the heat up behavior, such that the following model may be defined:

$$T_{WarmStart}(t)=T_{ColdStart}(t)+T_{CoolDown}(t) \quad \text{(Eq. 3)}$$

Compensating for $T_{HeatUp}(t)$ contributions in the event of a cold start preferably is achieved by subtracting these very heat contributions, i.e. by subtracting an expected $T_{HeatUp}(t)$, such that the compensated temperature is:

$$T_{ColdStartCompensated}(t)=T_{ColdStart}(t)-\ddot{T}_{HeatUp}(t) \cong T_{ambient}(t) \quad \text{(Eq. 4)}$$

with $T_{HeatUp}(t)$ a being the estimated/modelled heat-up known up-front.

According to embodiments of the present invention, also in the event of a warm start, cold start compensation is applied, i.e. Eq. 4 is applied, such that:

$$T_{ColdStartCompensated}(t)=T_{WarmStart}(t)-\ddot{T}_{HeatUp}(t) \cong T_{ambient}(t)+T_{CoolDown}(t) \quad \text{(Eq. 6)}$$

Now, first order temperature dynamics of the device are assumed, both for heat-up and cool-down processes, such that:

$$T_{HeatUp}(t) = T_{heat} * \exp(-t/\tau_{HeatUp}) \quad \text{(Eq. 7)}$$

$$\begin{aligned} T_{CoolDown}(t) &= T_{heat} * \exp(-(t+t_0)/\tau_{CoolDown}) \\ &= T_{heat} * \exp(-t_0/\tau_{CoolDown}) * \\ &\quad \exp(-t/\tau_{CoolDown}) \\ &= T_{heat} * \alpha * \exp(-t/\tau_{CoolDown}) \end{aligned} \quad \text{(Eq. 8)}$$

wherein to again refers to the time the device was powered-off, $T_{heat}$ is a coefficient, and the various T refer to constant parameters for defining the gradients of the heating up and cooling down.

Introducing the dynamics of Eq. 7 and 8 into Eq. 6 results in:

$$\begin{aligned} T_{ColdStartCompensated}(t) &= \\ T_{WarmStart}(t) - \ddot{T}_{HeatUp}(t) &\cong T_{ambient}(t) + T_{CoolDown}(t) \cong \\ T_{ambient}(t) + T_{heat} &* \alpha * \exp(-t/\tau_{CoolDown}) \end{aligned} \quad \text{(Eq. 9)}$$

As can be derived from Eq. 9, the compensated temperature in the event of a warm start is variable and depends on the time constant of the cool down characteristic of the device.

By accelerating the cold start-compensated signal using the cool-down dynamics, the target temperature is restored, and the warm start compensated course of temperature is:

$$T_{WarmStartCompensated}(t) = \quad \text{[Eq. 10]}$$

$$f_{dynAccel\_CoolDown}(T_{ColdStartCompensated}(t)) \cong$$

$$T_{ColdStartCompensated}(t) +$$

$$\tau_{CoolDown} * \left(\frac{d}{dt}T_{ColdStartCompensated}(t)\right) =$$

$$T_{ambient}(t) + T_{CoolDown}(t) + \tau_{CoolDown} * \left(\frac{d}{dt}T_{CoolDown}(t)\right) =$$

$$T_{ambient}(t) + T_{CoolDown}(t) + \tau_{CoolDown} *$$

$$(-1/\tau_{CoolDown} * T_{CoolDown}(t)) = T_{ambient}(t)$$

Figure 3:
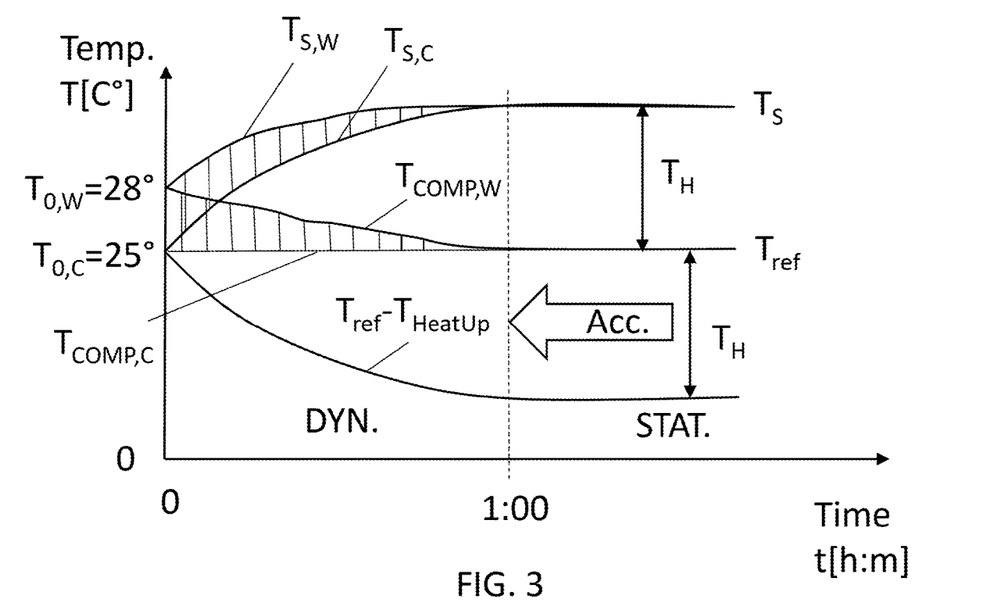

FIG. 3 shows further graphs illustrating courses of temperatures in connection with a cold start and a warm start of an electronic device, thereby referring to a method according to an embodiment of the present invention. For both, a cold start and a warm start of a corresponding device, it is assumed that the device is powered-on at time t=0. Now, temperature courses T over time with index S illustrate the corresponding temperature sensed by a temperature sensor of the device. Accordingly, for a cold start, the temperature sensor provides the sensed temperature $T_{S,C}$ over time. Again, in this scenario, the temperature at the location of the temperature sensor, as well as the temperature of any component and the temperature inside the device is assumed to be at ambient temperature $T_{ref}$ at t=0. In the present example, the ambient temperature $T_{ref}$ is assumed to be 25° C. For any of the present scenarios, it is assumed that the ambient temperature of the device does not change for the time being. Accordingly, in the event of a cold start, the temperature over time diagram shows a course of temperature $T_{S,C}$, i.e. $T_{ColdStart}$ of FIG. 1, starting at the reference temperature $T_{ref}$ and increasing during the first hour in time, i.e. until t=1:00, to reach a steady state temperature $T_{ref}+T_H$. The steady state temperature exceeds the reference temperature $T_{ref}$ by contribution $T_H$ which represents the contribution of heat spread from heat emitting components of the device during such cold start. This heat contribution $T_H$ accumulates to the actual reference temperature $T_{ref}$. In the present example, the heat contribution $T_H$ is assumed to be in the order of 5° C., such that the temperature sensed in the steady state, i.e. after t=1:00 is about 30° C. Hence, during the first hour after a power-on of the device in the event of a cold start, the heat emitting components heat up, until the steady state is reached at, assuming that this heat contribution $T_H$ is an average contribution of heat during a normal usage of the device.

The scenario of a cold start is classified into two periods: The first period DYN is the period, i.e. the first hour, in which heat emitted from the components of the device increases, and hence the heating up $T_{HeatUp}$ is non constant but dynamic, and in particular rises. When having reached the steady state, the second period STAT starts representing a stationary period where heat contribution no longer changes over time.

It is desired to compensate for the heat contribution stemming from active heat emitting components of the device, given that the heat contribution is the portion in the sensed temperature signal $T_{S,C}$ by which the sensed temperature $T_{S,C}$ deviates from the reference temperature $T_{ref}$. In the scenario of a cold start, the dynamics of the heat contribution $T_{HeatUp}$ over time is known up-front, e.g. from tests. Therefore, it is known for which dynamic heat contributions $T_{HeatUp}$ the sensed temperature signal $T_{S,C}$ is to compensate for. The compensation presently requires the subtracting of exactly the amount of heat contributed by the heat emitting components which is represented by the $T_{HeatUp}$ characteristic of FIG. 1. For illustration purposes, characteristic $T_{ref}-T_{HeatUp}$ is shown in FIG. 3 indicating that by means of the heat compensation the contributions in $T_{S,C}$ exceeding $T_{ref}$—which are represented by the area between the respective characteristics—are to be compensated by corresponding negative contributions represented by area between the $T_{ref}$ and $T_{ref}-T_{HeatUp}$ characteristics in FIG. 3. Hence, in accordance with Eq. 4, and only by substituting the labels of the different characteristics, the compensated temperature signal over time $T_{COMP,C}$ in the event of a cold start is:

$$T_{COMP,C}=T_{S,C}-T_{HeatUp}=T_{ref} \quad \text{(see Eq. 6)}$$

which is equal to the constant reference temperature that is assumed not to have changed during the investigated period in time. This exactly is the purpose of the present heat compensation, i.e. the real ambient temperature is desired to be presented, not falsified by device generated heat.

In contrast, in a warm start scenario as illustrated in connection with FIG. 1, the components of the device have not completely cooled down to the reference temperature $T_{ref}$ and may still emit some heat at the time of the anew power-on, and/or heat may still be captured in the interior of the device e.g. being stored in thermal capacitances such as the housing, etc. In such warm start event, the temperature sensor supplies the sensed temperature signal $T_{S,W}$. In view of a residual heat from the previous operations of the device, at the beginning t=0:00 of the warm start the temperature sensor already senses a temperature $T_{0,W}$ exceeding the reference temperature $T_{ref}$. In the present example, the $T_{0,W}$ is assumed to be 28° C., while the ambient temperature still is $T_{ref}=25°$ C. From this temperature level $T_{0,W}$ the sensed temperature $T_{S,W}$ increases until again a steady state $T_{ref}+T_H$ is reached in which the components of the device emit a constant amount of heat.

In the event of a warm start, it is still suggested, to compensate with the heat-up curve $T_{HeatUp}$ applied to a cold start. Hence, the resulting compensated temperature signal $T_{COMP,W}=T_S-T_{HeatUp}$ as shown in FIG. 1 provides contributions exceeding $T_{ref}$ during the dynamic period DYN, which contributions are indicated by the vertical lines between the two characteristics $T_{COMP,W}$ and $T_{ref}$. The compensated temperature signal $T_{COMP,W}$ in case of a warm start exceeds the compensated temperature signal $T_{COMP,C}$ in case of a cold start by the very same contributions that stem from the cooling down of the residual heat from the previous operation of the device. Accordingly, the compensated temperature signal $T_{COMP,W}$ does not reflect the real ambient temperature $T_{ref}$ in case of a warm start during the dynamic period DYN but shows temperature values too high.

As is indicated by the arrow labelled "Acc." in FIG. 3, it is suggested in the present embodiment to lower the period in time during which such incorrect temperature values are supplied in the compensated temperature signal $T_{COMP,W}$ in the event of a warm start. This is achieved by accelerating the heat compensated signal $T_{COMP,W}$.

Figure 4:
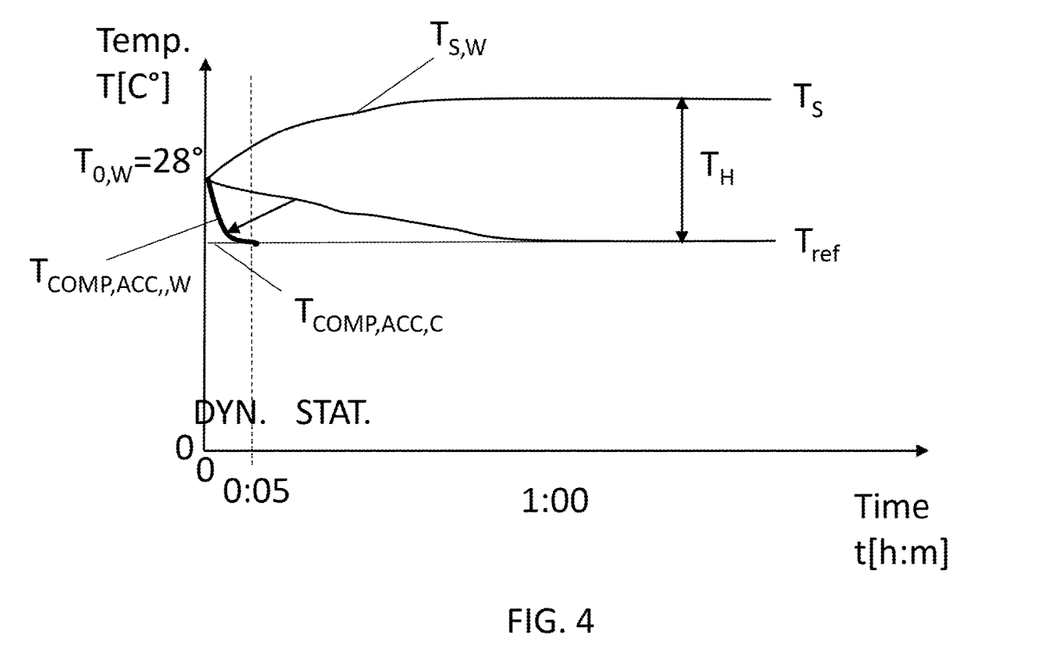

FIG. 4 illustrates such dynamics accelerated heat compensated temperature signal $T_{COMP,ACC,W}$ illustrates such accelerated heat compensation in the event of a warm start. Applying the same acceleration measures to cold start conditions, it becomes apparent that the accelerated heat compensated signal $T_{COMP,ACC,C}$ (FIG. 4) does not differ from the non-accelerated heat compensated signal $T_{COMP,C}$ (see FIG. 3) for the reason that the heat compensated temperature signal in the event of a cold start does not show any dynamics, i.e. no frequency contributions f>0 Hz. Hence, the compensation filter applied for accelerating the heat compensated temperature signal in the event of a warm start does not have any effect on the heat compensated temperature signal under cold start conditions. However, given that spectral components of the heat compensated temperature signal $T_{COMP,W,ACC}$ are accelerated, the accelerated heat compensated temperature signal $T_{COMP,ACC,W}$ reaches $T_{ref}$ way earlier, in the present example, e.g. after t=0.05. Hence, the accelerated heat compensated temperature signal $T_{COMP,ACC,W}$ much more resembles the reference temperature $T_{ref}$ than the heat compensator output $T_{COMP,W}$ that has no compensation filter applied. Consequently, the compensation filter helps in improving the quality of the measuring system such that the overall output of the device and method including the heat compensation and the dynamic compensation provides for a better quality especially in the event of a warm start.

Figure 2:
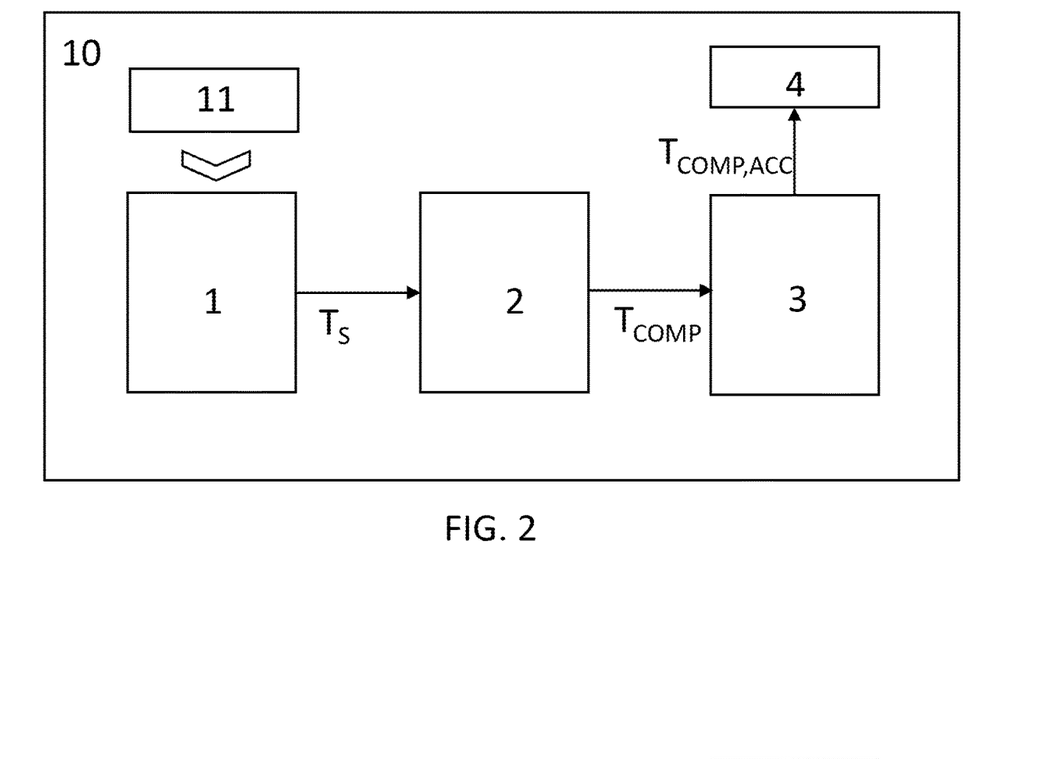
FIGS. 2 and 6 illustrate a block diagram of a sensor signal processing system each according to an embodiment of the present invention.

FIG. 2 illustrates both, a block diagram of a sensor signal processing system according to an embodiment of the present invention, and a method according to an embodiment of the present invention. FIG. 2 illustrates an electronic device 10 containing a temperature sensor 1, a compensator 2 and a compensation filter 2, each in a housing of the electronic device 10. The electronic device 10 hence represents the sensor signal processing system. The compensator 2 receives a sensed temperature signal $T_S$ from the temperature sensor 1 which temperature signal $T_S$ comprises heat contributions from heat emitting components 11 of the device 10. The compensator 2 supplies a heat compensated temperature signal $T_{COMP}$ to a compensation filter 3 arranged downstream to the compensator 2. The compensation filter 3 supplies a dynamics adjusted heat compensated temperature signal $T_{COMP,ACC}$ to a display 4 of the device 10, or to an application, for example. The compensator 2 and the compensating filter 3 including models are preferably implemented in software, in hardware, or in a combination of software and hardware, and preferably make use of circuitry embodied in a semiconductor chip, which semiconductor chip may also contain the temperature sensor 1 on chip, e.g. as a resistive temperature sensor.

Figure 6:
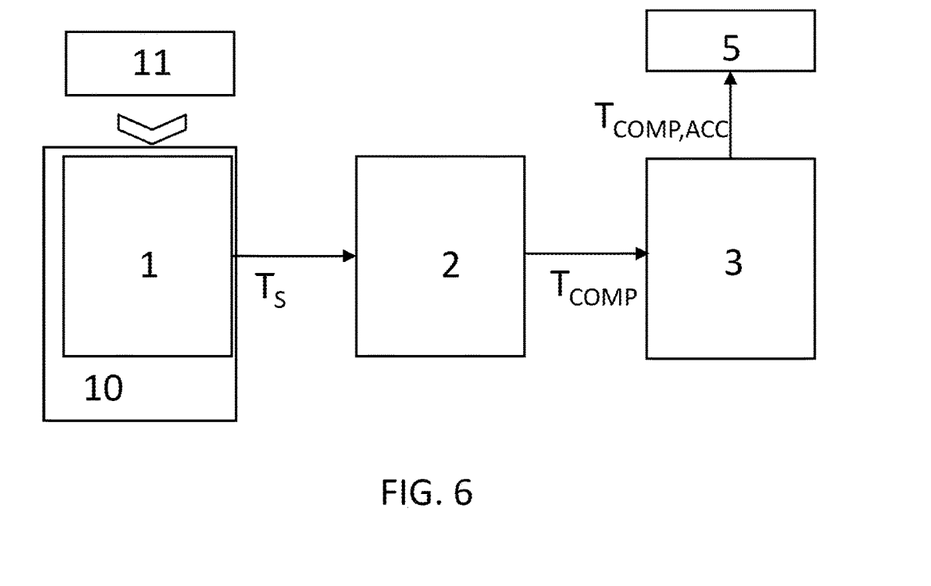

FIG. 6 illustrates both, a block diagram of a sensor signal processing system according to another embodiment of the present invention, and a method according to an embodiment of the present invention. In this embodiment, the electronic device 10 contains the temperature sensor 1, but neither the heat emitting components 11, nor the compensator 2 nor the compensation filter 3. The heat emitting components 11 may include a radiator in a building that is thermally coupled to the electronic device 10. The compensator 2 and the compensation filter 3 are arranged remote, and e.g. are implemented on a server in the Internet. The results of the processing are supplied from the compensation filter 3 to a remote device 5, such as a smart phone. This embodiment allows a user to remotely monitor temperature in a room with a radiator.

The way of processing the sensor signal is the same as described in connection with the system of FIG. 2.

Specifically, the heat compensator 2 may in one embodiment compensate the sensed temperature signal $T_S$ by subtracting a known cool-down temperature characteristic $T_{CoolDown}$ from the sensed temperature signal $T_S$. In a different embodiment, the impact of heat from the components 11 on the sensed temperature at the location of the temperature sensor 1 may make use of a dynamic thermal model of the device 10 and the temperature sensor 1 in case of FIG. 2, or of a thermal system including the components 11, the device 10 and the temperature sensor 1 in case of FIG. 6. The dynamic thermal model may mathematically be described by a differential equation system. The model may in one embodiment comprise one or more, and preferably the most relevant heat sources, and in another embodiment additionally one or more, and preferably the most relevant thermal conductivities, and in another embodiment additionally one or more, and preferably the most relevant heat capacities, as well as it comprises the temperature sensor 1, and it may comprise one or more optional temperature sensors that may be available in the device.

The heat compensated temperature $T_{COMP}$ may then be estimated from these inputs by using the following as compensator 2:

$$x(k+1)=Ax(k)+Bu(k)$$

$$y(k)=Cx(k)+B(k) \quad \text{(Eq. 11)}$$

with u(k) denoting the inputs at time step k, y(k) denoting the output, i.e. the heat compensated temperature signal $T_{COMP}$, and x(k) denoting an internal state vector of the compensator 2. A is an n-by-n matrix, B an n-by-m matrix, C an 1-by-n matrix and D an 1-by-m matrix, where n is the number of states that depends on the complexity of the model and m the number of inputs. Typical inputs may be, for example, signals from other temperature sensors of the device, and/or heat emitting information such as an intensity of a display, a time derivative of a battery charge level, a central processing unit load, or other power management information. From this thermal device model, a time-discrete compensator 2 according to the above state space description of Equation X can be derived, that can easily be implemented, e.g. on a microprocessor of the electronic device, by using the following software code:

```
while not stopped
{
    u=Read_Input( );      //  Read       input
    y=C*x+D*u;            //  Calculate  output
    x=A*x+B*u;            //  State      Update
    T_COMP=y;             //  Compensated Signal = y
}
```

When the compensator 2 is started for the very first time, initial values of internal states of the compensator 2 are required. In an assumption for such scenario the initial values of internal states are calculated based on the assumption that the system is in a steady-state. In such assumption, the initial values of the internal states x(k+1) at the initial point in time k+1 are assumed to be equal to the internal states x(k) of a previous point in time k. This assumption reflects a cold start.

However, in order to build the compensation filter 3 that compensates for dynamics in the heat compensated signal $T_{COMP}$, it is preferred to first model a system with a corresponding heat dissipating, or cool-down behaviour over time. The model may specifically represent the housing of the device and/or other components or thermal capacitances that impede an immediate release of heat from the device, and in particular from the location of the temperature sensor.

The following describes the modelling of a corresponding heat dissipating system from which model a suitable compensation filter 3 may be derived.

The heat dissipating system may be modelled by a transfer function in the spectral domain, the transfer function indicating the way an input is transformed into an output of the heat dissipating system. The transfer function G(s) generally describes the characteristics of the system in the frequency domain by $$T_S(s) = G(s) * T(s) \quad \text{(Eq. 12)}$$

The model of the system may be of first or of second order, but theoretically can be of any order subject to processing power, and subject to the complexity of the thermal dissipation.

E.g., in a less complex system, e.g. wherein a housing of the electronic device represents the major heat dissipating component, a first order model may approximate the system, which first order model is characterized by a transfer function in the frequency domain with one pole such that the generic design of such transfer function $G_1(s)$ may look like, specifically in a first order model:

$$G_1(s) = \frac{1}{(T_1 s + 1)}. \quad \text{(Eq. 13)}$$

where s denotes the complex Laplace variable and $T_1$ is a constant to be identified. $T_1$ is the time constant of the heat dissipation process.

In a second order model, a more sophisticated heat dissipating system can be described by a transfer function in the frequency domain with two poles and one zero such that the generic design of a corresponding transfer function $G_2(s)$ may look like:

$$G_2(s) = \frac{Ks + 1}{(T_1 s + 1)(T_2 s + 1)}, \quad \text{(Eq. 14)}$$

where s denotes the complex Laplace variable and K, $T_1$, $T_2$ are constants to be identified. $T_1$ and $T_2$ are time constants of the heat dissipation processes and K defines a coupling between the two processes.

For implementing the system model in a digital system such as a microcontroller the system model preferably is implemented in the discrete time domain rather than in the continuous frequency domain as described by equations 13 or 14. Therefore, the system model needs to be digitised, i.e. transformed into a set of difference equations.

First, the differential equations in the frequency domain, e.g. the equations 13 and 14, can be reverse transformed into the time continuous domain by the Laplace back-transform.

For a first order sensor model the time continuous state space description in the control canonical form is:

$$\frac{dx(t)}{dt} = A_c^M \cdot x(t) + B_c^M w(t) \quad \text{(Eq. 15)}$$
$$v(t) = C_c^M x(t) + D_c^M w(t)$$

again, with
w(t) denoting the sensed temperature $T_S$ at time t in the time domain,
x(t) denoting an internal state of the first order system model, and
v(t) denoting the system model output over time t.

In this time continuous state space representation, the coefficients A, B, C and D are determined by:

$$A_c^M = -\frac{1}{T_1}, B_c^M = 1, C_c^M = \frac{1}{T_1}, D_c^M = 0$$

Second, the representation in the time continuous domain may be transformed into the time discrete domain.

A time discrete state space representation equivalent to the time continuous state space representation for the second order sensor model may be:

$$\begin{bmatrix} x_1(k+1) \\ x_2(k+1) \end{bmatrix} = A_d^M \cdot \begin{bmatrix} x_1(k) \\ x_2(k) \end{bmatrix} + B_d^M w(k) \quad \text{(Eq. 16)}$$

$$v(t) = C_d^M \begin{bmatrix} x_1(k) \\ x_2(k) \end{bmatrix} + D_d^M w(k)$$

$$\begin{bmatrix} x_1(0) \\ x_2(0) \end{bmatrix} = (I - A_d^M)^{-1} B_d^M \cdot w(0)$$

where w denotes the sensed temperature $T_S$ at time step k with the sampling time $t(k+1)-t(k)=T_{sampling}$. There are two internal states $x_1(k)$, $x_2(k)$ of the second order sensor model. This means $x(k)=(x_1(k), x_2(k))^T$. v(k) denotes the sensor model output in the discrete time domain.

In this time discrete state space representation, the coefficients A, B, C and D are determined by:

$$A_d^M = e^{A_c^M T_s}, B_d^M = (A_c^M)^{-1} \left( e^{A_c^M T_{sampling}} - I \right) \cdot B_c^M$$

$$C_d^M = C_c^M, D_d^M = D_c^M$$

In addition, $$I = \begin{bmatrix} 1 & 0 \\ 0 & 1 \end{bmatrix}$$

and $T_{sampling}$ is the sampling time.

A time discrete state space representation of the time continuous state space representation for the first order sensor model may be:

$$x(k+1) = A_d^M \cdot x(k) + B_d^M \cdot w(k) \quad \text{(Eq. 17)}$$
$$v(k) = C_d^M \cdot x(k) + D_d^M \cdot w(k)$$
$$x(0) = \frac{B_d^M}{1 - A_d^M} w(0)$$

where w(k) denotes the sensed temperature $T_S$ at time step k with the sampling time $t(k+1)-t(k)=T_{sampling}$. There is an internal state x(k) of the first order system model. v(k) denotes the modelled system output in the discrete time domain.

In this time discrete state space representation, the coefficients A, B, C and D are determined by:

$$A_d^M = e^{-T_1 T_s}, B_d^M = -\frac{1}{T_1}\left(e^{-T_1 T_{sampling}} - 1\right)$$

$$C_d^M = 1, D_d^M = 0$$

where $T_{sampling}$ is the sampling time.

For the second order model of the sensor according to Eq. 14 the equivalent time continuous state space description in the control canonical form is:

$$\begin{bmatrix} \dfrac{dx_1(t)}{dt} \\ \dfrac{dx_2(t)}{dt} \end{bmatrix} = A_c^M \cdot \begin{bmatrix} x_1(t) \\ x_2(t) \end{bmatrix} + B_c^M w(t) \quad \text{(Eq. 18)}$$

$$v(t) = C_c^M x(t) + D_c^M w(t)$$

with w(t) denoting the sensed temperature $T_S$ at time t in the time domain, x1(t) and x2(t) denoting internal states of the second order system model, and v(t) denoting the system model output over time t.

In this time continuous state space representation, the coefficients A, B, C and D are determined by:

$$A_c^M = \begin{bmatrix} -\dfrac{T_1+T_2}{T_1 T_2} & \dfrac{1}{T_1 T_2} \\ 1 & 0 \end{bmatrix}, B_c^M = \begin{bmatrix} 1 \\ 0 \end{bmatrix}$$

$$C_c^M = \begin{bmatrix} \dfrac{K}{T_1 T_2} & \dfrac{1}{T_1 T_2} \end{bmatrix}, D_c^M = 0$$

There are different ways for identifying the parameters $T_1$, $T_2$ and K. One approach is to find the parameters by trial and error. In a first trial, the system output is simulated by the model wherein the model makes use of a first estimation of the parameters. The output of the model then is compared with the system signal supplied by the real temperature sensor. Afterwards, the parameters are adjusted until a deviation between the simulated temperature sensor output and the real temperature signal is acceptably small.

The time discrete state space representations of the first or the second order system model may be run on a microprocessor, and the parameters $T_1$ or $T_1$, $T_2$ and K respectively may be varied until the system model output v(k) is close enough to the real sensor signal u(t) which may be present in digitized form u(k), too, or may be digitized for comparing purposes.

More sophisticated methodologies for determining the parameters of the system model may use system identification tools that automatically build dynamical models from measured data.

The derivation of the matrices for the first and the second order sensor model requires Schur decomposition or series expansion and matrix inversion. Computer software may help to calculate the coefficients.

In a next step, the compensation filter 3 is determined and implemented.

If a first order system model is applied, the following first order compensation filter 3 is proposed, which may be described by a transfer function $C_1(s)$ in the frequency domain by:

$$C_1(s) = \dfrac{(T_1 s + 1)}{(P s + 1)}. \quad \text{(Eq. 19)}$$

When the system is modelled by a second order model then, advantageously, the compensation filter 3 is modelled by a second order model, too. The transfer function $C_2(s)$ of such a second order compensation filter 3 in the frequency domain may be described by:

$$C_2(s) = \dfrac{(T_1 s + 1)(T_2 s + 1)}{(K s + 1)(P s + 1)} \quad \text{(Eq. 20)}$$

For both models, s denotes the complex Laplace variable and K, $T_1$, $T_2$ are the constants that were identified when determining the system model.

C(s) generally denotes the transfer function of the compensation filter in the frequency domain, wherein $$T_{COMP,ACC}(s) = C(s)^* T_{COMP}(s) \quad \text{(Eq. 21)}$$

Preferably, the compensation filter transfer function C(s) is the inverse to the system model transfer function G(s), i.e. the diffusion function, such that $$C(s) = 1/G(s) \quad \text{(Eq. 22)}$$

The term (Ps+1) is introduced in the compensator transfer function to make the function physically applicable. Parameter P is kept small in order to keep impact on filter function low, but can be used to filter measurement noise.

An important feature of the compensation filter transfer function C(s) is that the final value of C(s) converges to 1, i.e.

$$\lim_{s \to 0} C(s) = 1$$

This means that the compensation filter 3 only changes the sensor output characteristic during transition of its input. When the input to the compensation filter is in steady state, it does not affect the compensation filter output, even if the modelling of the system should be inaccurate. Please note that overshoots may occur if the real system response T(t) is faster than modelled.

Typically, the compensation filter 3 is implemented in a digital system such as a microcontroller which operates on samples of the measured temperature signal rather than on the continuous signal. As a consequence, microcontrollers cannot integrate and not implement differential equations like those in Eq. 19 or 20. Therefore, the compensation filter 3 needs to be digitised, i.e. transformed into a set of difference equations.

First, the differential equations in the spectral domain, i.e. the Eq. 19 and 20 in the present example, can be reverse transformed into the time continuous domain by the Laplace back-transform.

For the first order compensation filter 3 the time continuous state space description in the control canonical form is:

$$\dfrac{dx(t)}{dt} = A_c^C \cdot x(t) + B_c^C u(t) \quad \text{(Eq. 23)}$$

$$y(t) = C_c^C x(t) + D_c^C u(t)$$

with u(t) denoting the heat compensated temperature signal $T_{COMP}$ at time t in the time domain, i.e. the sensed temperature signal $T_{COMP,C}$ or $T_{COMP,W}$ in FIG. 3, x(t) denoting an internal state of the second order compensation filter, and y(t) denoting the dynamics accelerated compensated sensor signal, i.e. $T_{COMP,ACC,W}$ or $T_{COMP,ACC,C}$ in FIG. 3.

In this time continuous state space representation, the coefficients A, B, C and D are determined by:

$$A_c^C = -\frac{1}{P}, B_c^C = 1, C_c^C = \frac{P - T_1}{P^2}, D_c^C = \frac{T_1}{P}$$

For the second order compensation filter 3 the time continuous state space description in the control canonical form is:

$$\begin{bmatrix} \frac{dx_1(t)}{dt} \\ \frac{dx_2(t)}{dt} \end{bmatrix} = A_c^C \cdot \begin{bmatrix} x_1(t) \\ x_2(t) \end{bmatrix} + B_c^C u(t) \quad \text{(Eq. 24)}$$

$$y(t) = C_c^C x(t) + D_c^C u(t)$$

with u(t) denoting the heat compensated temperature signal $T_{COMP}$ at time t in the time domain, i.e. the sensed temperature signal $T_{COMP,C}$ or $T_{COMP,W}$ in FIG. 3 at time t in the time domain, x1(t) and x2(t) denoting internal states of the second order compensation filter, and y(t) denoting the dynamics accelerated compensated sensor signal $T_{COMP,ACC}$, i.e. $T_{COMP,ACC,W}$ or $T_{COMP,ACC,C}$ in FIG. 3.

In this time continuous state space representation, the coefficients A, B, C and D are determined by:

$$A_c^C = \begin{bmatrix} \frac{K+P}{KP} & \frac{1}{KP} \\ 1 & 0 \end{bmatrix}, B_c^C = \begin{bmatrix} 1 \\ 0 \end{bmatrix}, D_c^C = \frac{T_1 T_2}{KP}$$

$$C_c^C = \begin{bmatrix} \frac{T_1 + T_2}{KP} - \frac{T_1 T_2 (K+P)}{(KP)^2} & \frac{1}{KP} - \frac{T_1 T_2}{(KP)^2} \end{bmatrix}$$

Second, the representation in the time continuous domain may be transformed into the time discrete domain.

A time discrete state space representation of the time continuous state space representation for the first order compensation filter 3 may be:

$$x(k+1) = A_d^C \cdot x(k) + B_d^C \cdot u(k) \quad \text{(Eq. 25)}$$

$$y(k) = C_d^C \cdot x(k) + D_d^C \cdot u(k)$$

$$x(0) = \frac{B_d^C}{1 - A_d^C} u(0)$$

where u(k) denotes the heat compensated temperature $T_{COMP}$ at time step k with the sampling time $t(k+1)-t(k) = T_{sampling}$. There is an internal state x(k) of the first order compensator. y(k) denotes the accelerated heat compensated temperature signal $T_{COMP,ACC}$ in the discrete time domain.

In this time discrete state space representation, the coefficients A, B, C and D are determined by:

$$A_d^C = e^{-PT_s}, B_d^C = -\frac{1}{P}\left(e^{-PT_{sampling}} - 1\right)$$

$$C_d^C = \frac{P - T_1}{P^2}, D_d^C = \frac{T_1}{P}$$

A time discrete state space representation of the time continuous state space representation for the second order compensation filter 3 may be:

$$\begin{bmatrix} x_1(k+1) \\ x_2(k+1) \end{bmatrix} = A_d^C \cdot \begin{bmatrix} x_1(k) \\ x_2(k) \end{bmatrix} + B_d^C u(k) \quad \text{(Eq. 26)}$$

$$y(t) = C_d^C \begin{bmatrix} x_1(k) \\ x_2(k) \end{bmatrix} + D_d^C u(k)$$

$$\begin{bmatrix} x_1(0) \\ x_2(0) \end{bmatrix} = (I - A_d^C)^{-1} B_d^C \cdot u(0)$$

where u(k) denotes the heat compensated temperature signal $T_{COMP}$ at time step k with the sampling time $t(k+1)-t(k)=T_{sampling}$. There are two internal states of the second order compensator, i.e. $x(k)=(x_1(k), x_2(k))^T$. y(k) denotes the dynamics accelerated heat compensated temperature signal $T_{COMP,ACC}$ in the discrete time domain.

In this time discrete state space representation, the coefficients A, B, C and D are determined by:

$$A_d^C = e^{A_c^C T_{sampling}}$$

$$B_d^C = (A_c^C)^{-1}\left(e^{A_c^C T_{sampling}} - I\right) \cdot B_c^C$$

$$C_d^C = C_c^C$$

$$D_d^C = D_c^C$$

The derivation of the matrices for the first and the second order compensation filter 3 requires Schur decomposition or series expansion and matrix inversion. Computer software may help to calculate the coefficients.

Figure 5:
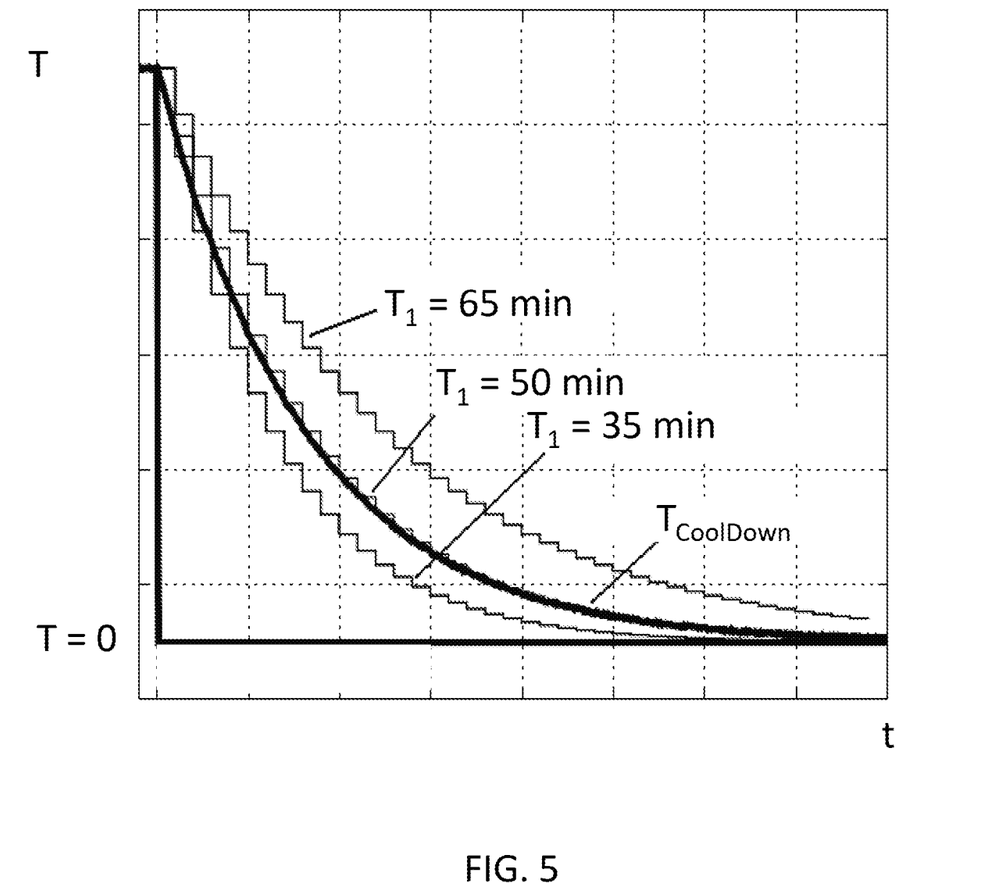

The diagram in FIG. 5 illustrates an embodiment how to set up the heat dissipating model for the purpose of deriving the compensation filter 3. Up-front, it is determined, that the heat dissipating system may best be represented by a first order model. Consequently, the system model is built by means of the transfer function:

$$G_1(s) = \frac{1}{(T_1 s + 1)} \quad \text{(see Eq. 13)}$$

wherein the parameter $T_1$ needs to be determined.

In a first step, the temperature sensor 1 senses the temperature $T_S = T_{CoolDown}$ in response to a power-off of the device which course of temperature preferably is recorded. In order to determine the best parameter $T_1$, the system model should fit the real system output $T_{CoolDown}$ best. The first order type system model according to Eq. 13 is implemented on a microcontroller in the time discrete state space according to the equations that were explained previously:

$$x(k+1) = A_d^M \cdot x(k) + B_d^M \cdot w(k)$$

$$v(k) = C_d^M \cdot x(k) + D_d^M \cdot w(k)$$

-continued $$x(0) = \frac{B_d^M}{1 - A_d^M} w(0)$$

With coefficients $$A_d^M = e^{-T_1 T_s}, B_d^M = -\frac{1}{T_1}\left(e^{-T_1 T_{sampling}} - 1\right)$$
$$C_d^M = 1, D_d^M = 0$$

In this time discrete state space representation of the heat dissipation model, an initial value of the parameter $T_1$ is chosen, e.g. $T_1=65$ min. The system model output with $T_1=65$ min is illustrated in FIG. 5. The system model is also run with parameters $T_1=35$ min and $T_1=65$ min. The corresponding system model outputs are illustrated in FIG. 5, too. The value of the parameter $T_1$ is chosen that makes the system model output come closest to the real system output signal. From FIG. 5 it can e.g. be derived, that in the present example, this is the case for $T_1=50$ min.

In a next step, the compensation filter 3 can be determined to be a first order model with a general representation in the frequency domain of $$C_2(s) = \frac{T_1 s + 1}{Ps + 1} \qquad \text{(see Eq. 19)}$$

including $T_1$ as determined previously, and having set $P=1$, for example.

For the representation in the time discrete domain it can be referred to Eq. 25 and the corresponding coefficients.

The invention claimed is:

1. A method for processing a signal supplied by a sensor, comprising:
receiving the sensed signal,
compensating the sensed signal for a contribution caused by one or more heat emitting components,
adjusting the compensated signal in its dynamics,
providing the dynamics adjusted compensated sensor signal,
wherein in response to a power-on of the one or more heat emitting components the sensed signal is compensated for the contribution varying over time expected in the event of a cold start of the one or more heat emitting components,
wherein the varying contribution over time expected in the event of a cold start is a course starting from zero contribution at a time of the power-on and rising to a steady state level of contribution, and
wherein the cold start represents a power-on of the one or more heat emitting components at a point in time without providing contributions to the sensed signal originating from a previous power-on period of the one or more heat emitting components.

2. The method according to claim 1,
wherein the sensor is one of:
a temperature sensor;
a humidity sensor;
a gas sensor;
wherein the one or more heat emitting components are thermally coupled to the temperature sensor in the event of the temperature sensor, or absorb or release humidity or cause components different from the heat emitting components to absorb or release humidity, in the event of the humidity sensor, or absorb or release gas or cause components different from the heat emitting components to absorb or release gas, in the event of the gas sensor,
wherein the contribution to the sensed signal to be compensated for is heat emitted by the one or more heat emitting components in the event of the temperature sensor, or humidity absorbed or released in response to heat emitted by the one or more heat emitting components in the event of the humidity sensor, or gas absorbed or released in response to heat emitted by the one or more heat emitting components in the event of the gas sensor, respectively.

3. The method according to claim 2,
wherein adjusting the compensated signal in its dynamics includes compensating the compensated signal for a dissipation of residual heat, dissipation or absorption of humidity or dissipation or absorption of gas over time, originating from a previous power-on period of the one or more heat emitting components.

4. The method according to claim 2,
wherein for adjusting the compensated signal in its dynamics, the compensated signal is filtered by a compensation filter based on an inverse of a transfer function of a model modelling the dissipation of heat, dissipation or absorption of humidity or gas from an electronic device comprising the temperature sensor.

5. The method according to claim 1,
wherein the sensed signal is compensated in response to the power-on by subtracting the expected varying contribution over time from the sensed signal resulting in the compensated signal.

6. The method according to claim 1, wherein the adjusting of the compensated signal in its dynamics is terminated after a defined period in time.

7. The method according to claim 6,
wherein the defined period in time is defined by the time the steady state level of the contribution is expected to be reached in the event of a power-off.

8. The method according to claim 1,
wherein the sensor is a temperature sensor and supplies a temperature signal,
wherein the sensed temperature signal is compensated for a contribution caused by the one or more heat emitting components,
wherein the heat compensated temperature signal is adjusted in its dynamics, and the dynamics adjusted heat compensated temperature signal is provided, and is displayed on a display of an electronic device or is used for controlling a device or component.

9. The method according to claim 8, wherein the sensed temperature signal is compensated in response to the power-on by subtracting the expected varying heat contribution over time from the sensed temperature signal resulting in the heat compensated temperature signal.

10. The method according to claim 8,
wherein for adjusting the compensated signal in its dynamics, the compensated signal is filtered by a compensation filter based on an inverse of a transfer function of a model modelling the dissipation of heat from an electronic device comprising the temperature sensor.

11. The method according to claim 8,
wherein the adjusting of the heat compensated temperature signal is terminated after a defined period in time, wherein the defined period in time is defined by the time the steady state level of the contribution is expected to be reached in the event of a power-off.

12. A non-transitory computer program element for adjusting a sensor signal, the computer program element comprising computer program instructions for implementing a method according to any of the preceding claims when executed on a processing unit.

13. A sensor signal processing system, comprising
a sensor providing a sensor signal,
one or more heal emitting components,
a compensator configured to compensate the sensed signal (Ts) for a contribution caused by the one or more heat emitting components, and
a compensation filter configured to adjust the compensated signal in its dynamics,
wherein the compensator is configured to, in response to a power-on of the one or more heat emitting components, compensate the sensed signal for the contribution varying over time expected in the event of a cold start of the one or more heat emitting components,
wherein the varying contribution over time expected in the event of a cold start is a course starting from zero contribution at a time of the power-on and rising to a steady state level of contribution, and
wherein the cold start represents a power-on of the one or more heat emitting components at a point in time without providing contributions to the sensed signal originating from a previous power-on period of the one or more heat emitting components.

14. The sensor signal processing system according to claim 13,
wherein the sensor is one of a temperature sensor, a humidity sensor or a gas sensor,
wherein the one or more heat emitting components are thermally coupled to the temperature sensor in the event of the temperature sensor, or absorb or release humidity or cause components different from the heat emitting components to absorb or release humidity, in the event of the humidity sensor, or absorb or release gas or cause components different from the heat emitting components to absorb or release gas, in the event of the gas sensor.

15. The sensor signal processing system according to claim 13, comprising
an electronic device in form of a thermostat including the temperature sensor, the compensator and the compensation filter,
wherein the one or more heat emitting components is a heater external to the electronic device.

* * * * *